United States Patent
Tsukimori et al.

(10) Patent No.: US 7,673,163 B2
(45) Date of Patent: Mar. 2, 2010

(54) SEMICONDUCTOR INTEGRATED CIRCUIT DEVICE WITH POWER SOURCE AREAS

(75) Inventors: Akifumi Tsukimori, Tokyo (JP); Takahiro Irita, Tokyo (JP); Hisashi Kato, Tokyo (JP)

(73) Assignees: Renesas Technology Corp., Tokyo (JP); NTT Docomo, Inc., Tokyo (JP)

( * ) Notice: Subject to any disclaimer, the term of this patent is extended or adjusted under 35 U.S.C. 154(b) by 599 days.

(21) Appl. No.: 11/588,259

(22) Filed: Oct. 27, 2006

(65) Prior Publication Data
US 2007/0101174 A1    May 3, 2007

(30) Foreign Application Priority Data
Oct. 28, 2005   (JP) .............................. 2005-314137

(51) Int. Cl.
*G06F 1/26* (2006.01)
(52) U.S. Cl. .................. 713/323; 713/300; 713/320; 713/330
(58) Field of Classification Search .......... 713/323
See application file for complete search history.

(56) References Cited
U.S. PATENT DOCUMENTS

| | | | | |
|---|---|---|---|---|
| 6,212,645 B1 * | 4/2001 | Tjandrasuwita | ............ | 713/330 |
| 6,510,525 B1 * | 1/2003 | Nookala et al. | ............ | 713/324 |
| 6,715,090 B1 * | 3/2004 | Totsuka et al. | ............ | 713/323 |
| 6,728,892 B1 * | 4/2004 | Silvkoff et al. | ............ | 713/320 |
| 7,023,757 B2 * | 4/2006 | Watanabe et al. | ............ | 365/227 |
| 7,219,248 B2 * | 5/2007 | Shikata | ............ | 713/323 |
| 7,376,847 B2 * | 5/2008 | Chen et al. | ............ | 713/300 |
| 7,398,409 B2 * | 7/2008 | Okada | ............ | 713/323 |
| 2004/0158756 A1 * | 8/2004 | Totsuka et al. | ............ | 713/323 |
| 2005/0010887 A1 * | 1/2005 | Bednar et al. | ............ | 716/8 |
| 2006/0218424 A1 * | 9/2006 | Abramovici et al. | ........ | 713/323 |
| 2008/0016383 A1 * | 1/2008 | Watanabe et al. | ............ | 713/323 |

* cited by examiner

*Primary Examiner*—Nitin C Patel
(74) *Attorney, Agent, or Firm*—Miles & Stockbridge P.C.

(57) ABSTRACT

The power supply is effectively controlled in a semiconductor integrated circuit device having a multi domain structure so as to reduce the power consumption. When an interrupt signal is inputted, the system controller makes an instruction of wakeup to the corresponding switch control unit. At this moment, the system controller controls power supply so as to be supplied sequentially from the core power source area belonging to the lower hierarchical level dependent on the core power source area to which power is supplied. The system controller outputs the power supply switch-on request signal to the switch control unit. The switch control unit turns ON the power supply switch and sends the power-on completion signal back to the system controller. Similarly, the system controller supplies power sequentially to core power source areas in the dependency relation one after another from the lower hierarchy to the upper hierarchy.

3 Claims, 10 Drawing Sheets

SEMICONDUCTOR INTEGRATED CIRCUIT DEVICE WITH POWER SOURCE AREAS

CROSS-REFERENCE TO RELATED APPLICATION

The present application claims priority from Japanese Patent Application No. JP 2005-314137 filed on Oct. 28, 2005, the content of which is hereby incorporated by reference into this application.

TECHNICAL FIELD OF THE INVENTION

The present invention relates to a technology for reducing the power consumption in a semiconductor integrated circuit device. More specifically, it relates to a technology effectively applied to the reduction of power consumption in a semiconductor integrated circuit device having a multi domain structure.

BACKGROUND OF THE INVENTION

In recent years, a cellular phone has spread widely as one of mobile communication devices, and the multifunctionality has been required for the mobile devices. For example, in a semiconductor integrated circuit device used in the cellular phone, the demand for low power consumption has been extremely strong.

As the technology for low power consumption in this kind of semiconductor integrated circuit device, for example, one technology where a core power source area is divided, and ON and OFF of the power source is controlled for each of the divided areas is known.

According to the examinations by the inventors of the present invention, in the ON/OFF control of the power source, there is the one which supports the two modes of R-standby mode and U-standby mode.

The R-standby mode is an operation mode where power supply to all areas (function modules) other than a built-in RAM (Random Access Memory) and a backup module which resets the contents of a part of registers to the state before power shutdown after recovery of power supply is turned OFF, and thus a quick state recovery is possible by external interruption.

At the time of this R-standby mode, the built-in RAM is controlled to be in a Resume mode (low leakage current state where contents can be retained and access is prohibited).

Meanwhile, the U-standby mode is an operation mode where power supply to all the areas other than an I/O (Input/Output) circuit and a power supply control circuit is turned OFF, and a power-on reset state is kept after recovery of power supply.

SUMMARY OF THE INVENTION

However, the inventors of the present invention have found the following problems in the technology for low power consumption described above.

Regarding the semiconductor integrated circuit devices used in cellular phones, for example, there is a data processing system having a multi domain structure which is equipped with three CPUs and configured of respectively different semiconductor integrated circuit devices. In this case, for example, such a use state may occur where only an arbitrary domain is in an ON state (for example, the state of performing data processing) and remaining domains are in an OFF state (for example, the state of not performing data processing).

In this case, by shutting down the power supply to the domains which are in an OFF state, the reduction in power consumption may be attained. However, in the above-described R-standby mode and the U-standby mode, it is difficult to control the states of plural power sources in accordance with the use state of semiconductor integrated circuit devices having multi domain structure, and as a consequence, the effective reduction in power consumption cannot be achieved.

Accordingly, an object of the present invention is to provide a technology capable of performing an efficient power supply control and achieving a low power consumption operation in a semiconductor integrated circuit device having multi domain structure.

The above and other objects and novel characteristics of the present invention will be apparent from the description of this specification and the accompanying drawings.

The typical ones of the inventions disclosed in this application will be briefly described as follows.

In order to achieve the object described above, one aspect of the present invention provides a semiconductor integrated circuit device including a plurality of power source areas where power supply voltage supplied thereto is controlled individually and functionally-related dependency relations are respectively associated thereto, wherein power supply control means which performs a control to supply the power supply voltage sequentially from the power source area belonging to a lower hierarchy dependent on the arbitrary power source area to an arbitrary power source area when a control signal to supply power to an arbitrary power source area is outputted is provided.

Further, outlines of other aspects of the present invention will be briefly described below.

In an aspect of the present invention, the power supply control means comprises: a control unit which receives an interrupt signal for recovering from a power supply shutdown state to a power supply state and outputs a power supply switch request signal for performing a power supply to an arbitrary power source area according to the received interrupt signal; and a power supply switch control unit which is provided in each of the power source areas and controls power supply voltage supplied in the power source area according to the power supply switch request signal outputted from the control unit.

In another aspect of the present invention, the power supply switch control unit comprises: a switch connected between the power source area and a reference potential; and a switch control unit which outputs a signal for controlling an operation of the switch on the basis of the power supply switch request signal outputted from the control unit and sends a power-on completion signal back to the control unit when the switch turns ON.

In another aspect of the present invention, the control unit comprises: a first register which stores flag information of the arbitrary power source area corresponding to the interrupt signal; a second register which stores flag information showing the power supply state of the respective power source areas in current status; a complementary logic unit which outputs flag information corresponding to the power source area dependent on the arbitrary power source area to which power is supplied, from the flag information of the first register, in reflection to the flag information of the second register; a third register which stores flag information outputted from the complementary logic unit; and a power supply request logic unit which, on the basis of the flag information of the third register, controls power supply voltage so as to be supplied sequentially from the power source area belonging to a lower hierarchical level dependent on the arbitrary power source area to the arbitrary power source area.

In another aspect of the present invention, when the arbitrary power source area recovers from the power supply shutdown, the power supply control means performs a control to supply a dummy clock signal for initializing the power source area.

In another aspect of the present invention, when the arbitrary power source area has a volatile semiconductor memory, the power supply control means determines a use state of the volatile semiconductor memory and sets the volatile semiconductor memory at a resume mode when the memory is not in use.

The effects obtained by typical aspects of the present invention will be briefly described below.

(1) It becomes possible to optimize the power consumption in a semiconductor integrated circuit device.

(2) Further, it becomes possible to prevent the power supply voltage drop when the power supply voltage is supplied to the power source areas, and thus the reliability of a semiconductor integrated circuit device can be improved.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
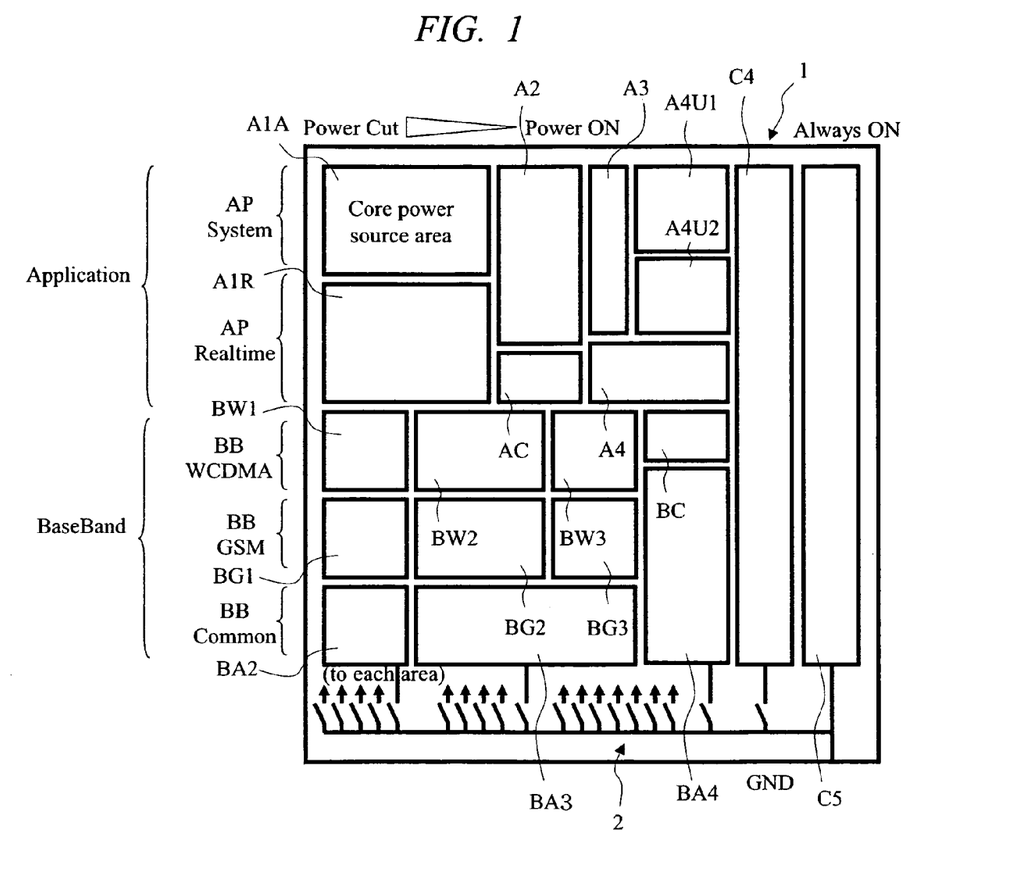
FIG. 1 is an explanatory diagram showing power source areas in a semiconductor integrated circuit device according to an embodiment of the present invention.
Figure 2:
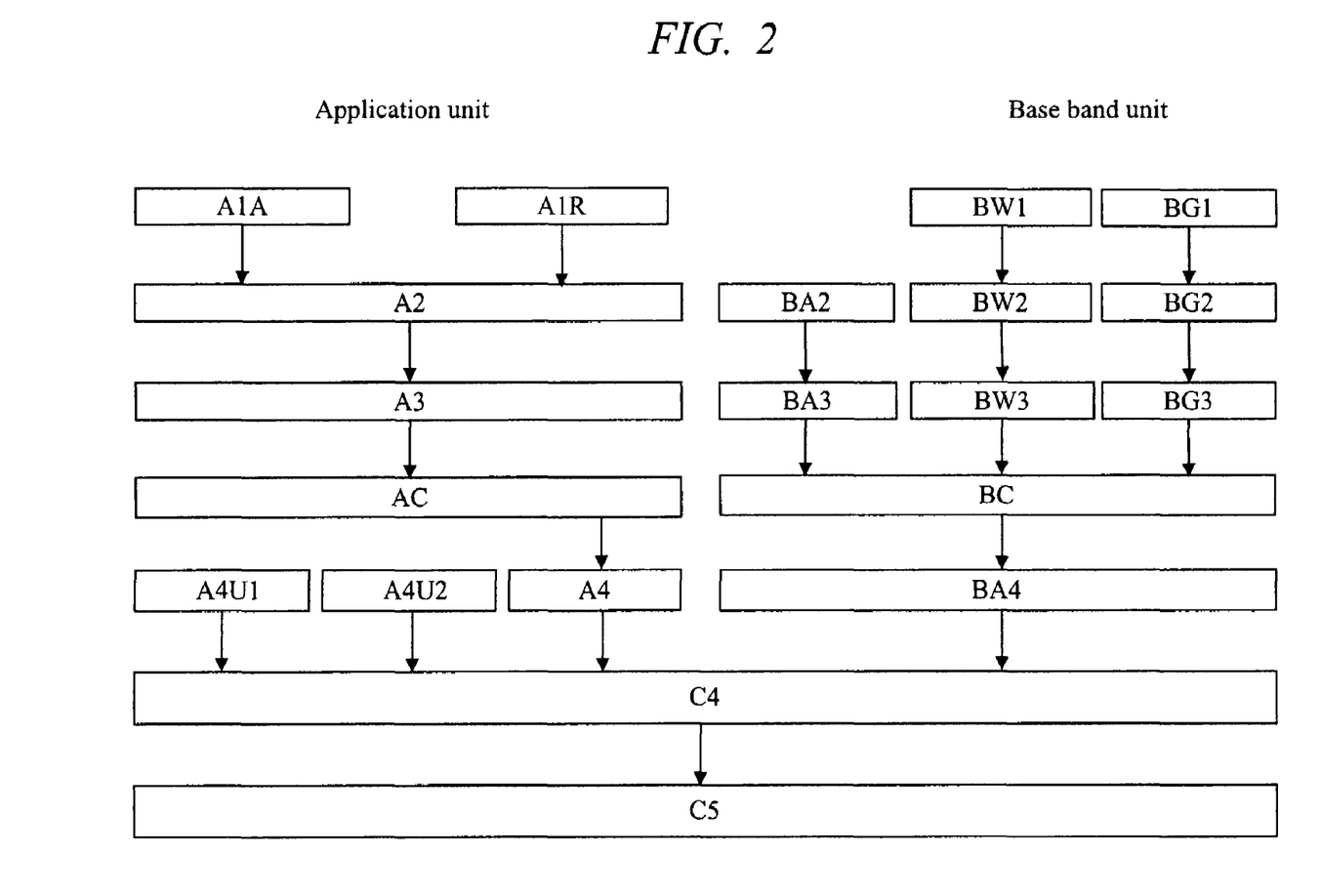
FIG. 2 is an explanatory diagram showing the hierarchical relations of core power source areas in the semiconductor integrated circuit device in FIG. 1.
Figure 3:
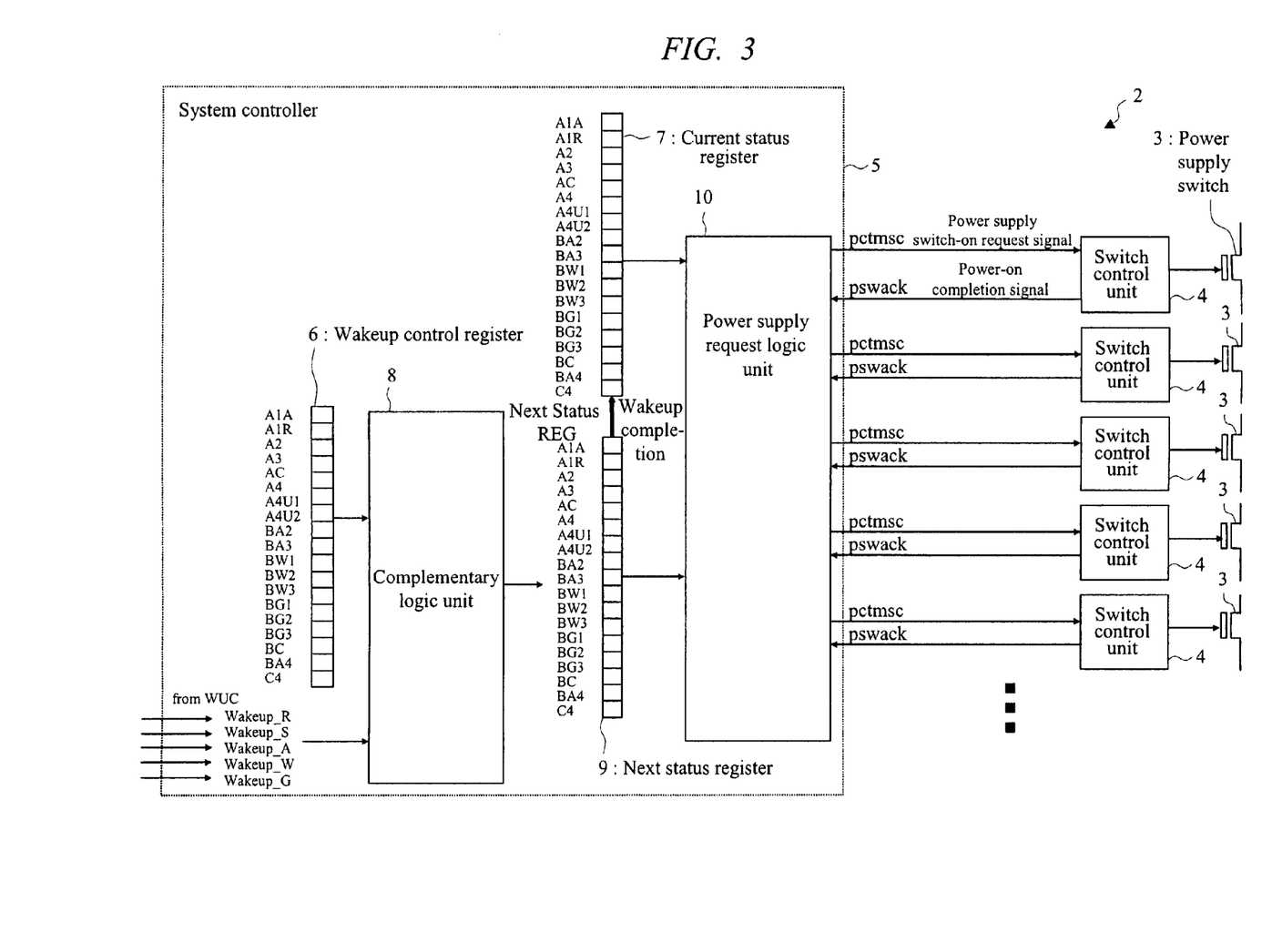
FIG. 3 is an explanatory diagram showing the structure of a power supply control unit provided in the semiconductor integrated circuit device in FIG. 1.
Figure 4:
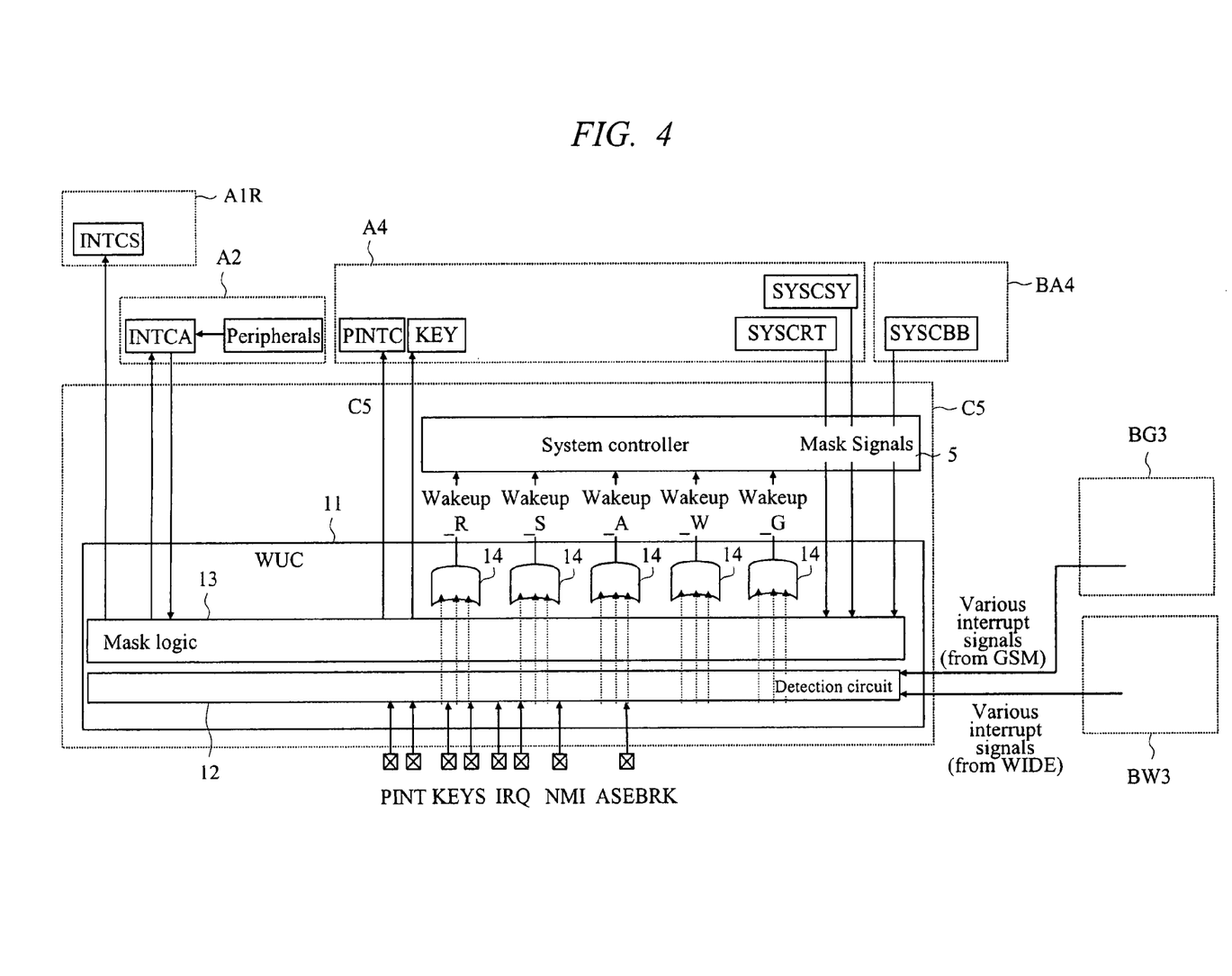
FIG. 4 is an explanatory diagram showing a WUC for generating a wakeup signal to be inputted to a complementary logic unit provided in the semiconductor integrated circuit device in FIG. 1.
Figure 5:
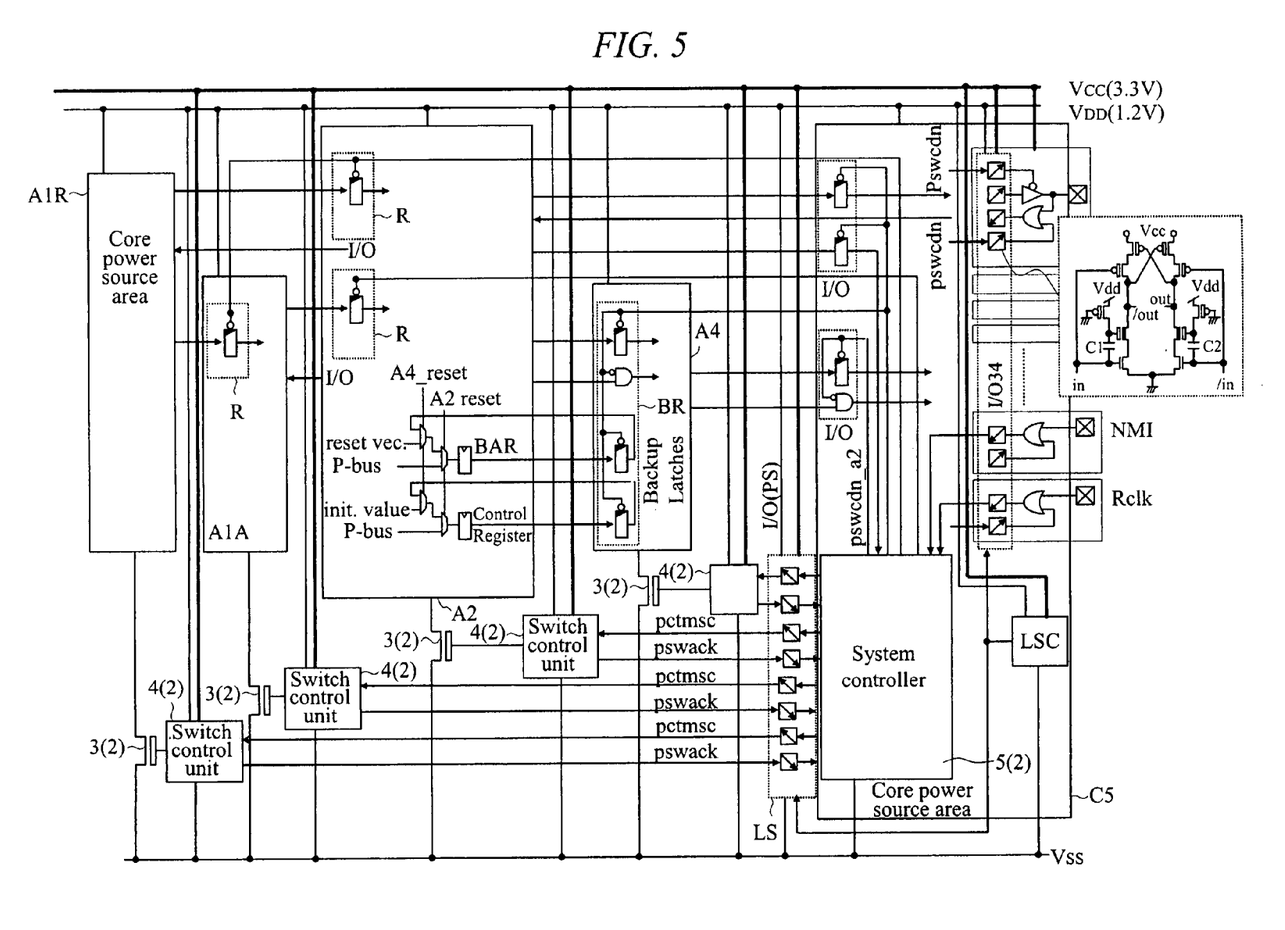
FIG. 5 is an explanatory diagram showing a power supply control unit and core power source areas around it provided in the semiconductor integrated circuit device in FIG. 1.
Figure 6:
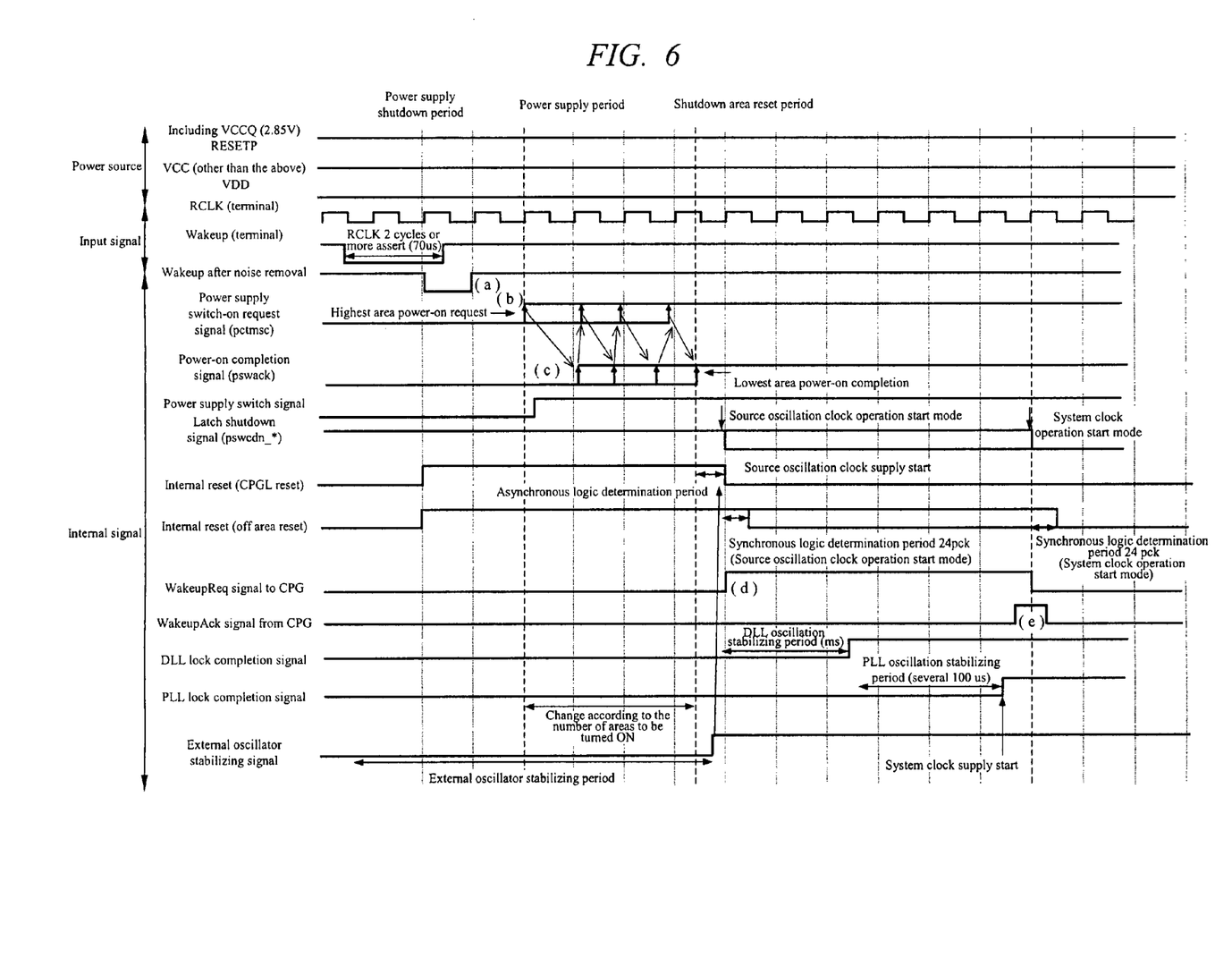
FIG. 6 is a timing chart showing the sequence of wakeup processing by the power supply control unit in FIG. 5.
Figure 7:
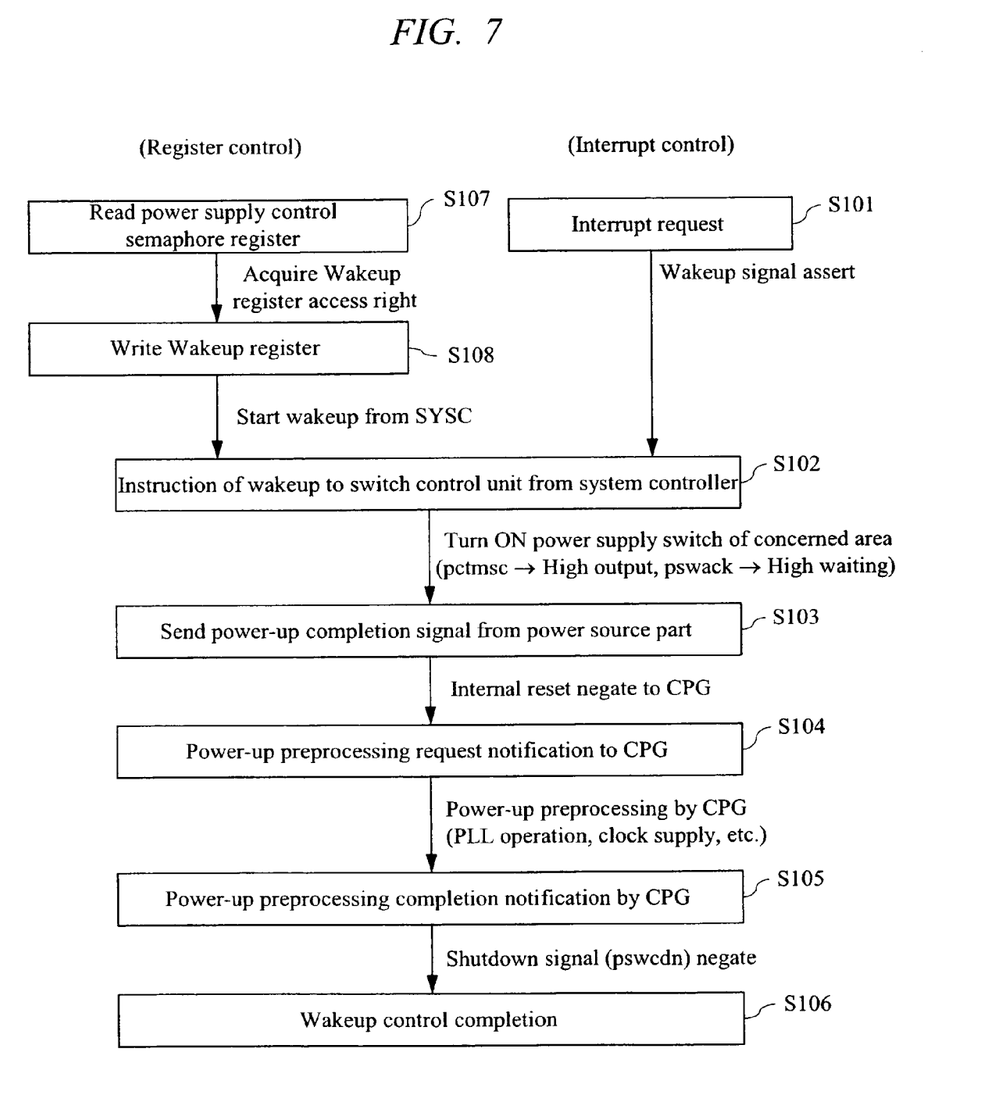
FIG. 7 is a flowchart showing the sequence of wakeup processing by the power supply control unit in FIG. 5.
Figure 8:
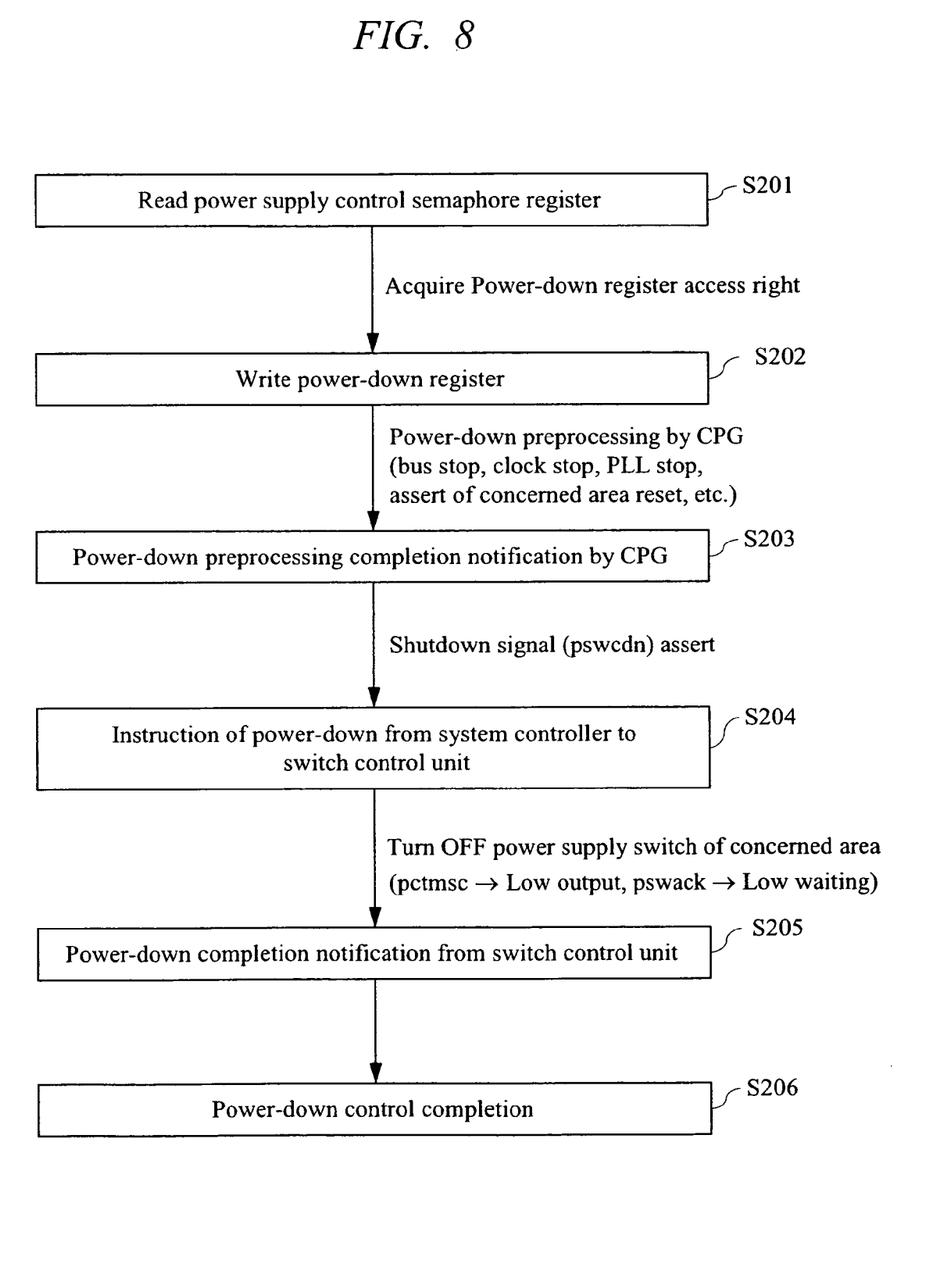
FIG. 8 is a flowchart showing an example of power supply shutdown processing by the power supply control unit in FIG. 5.
Figure 9:
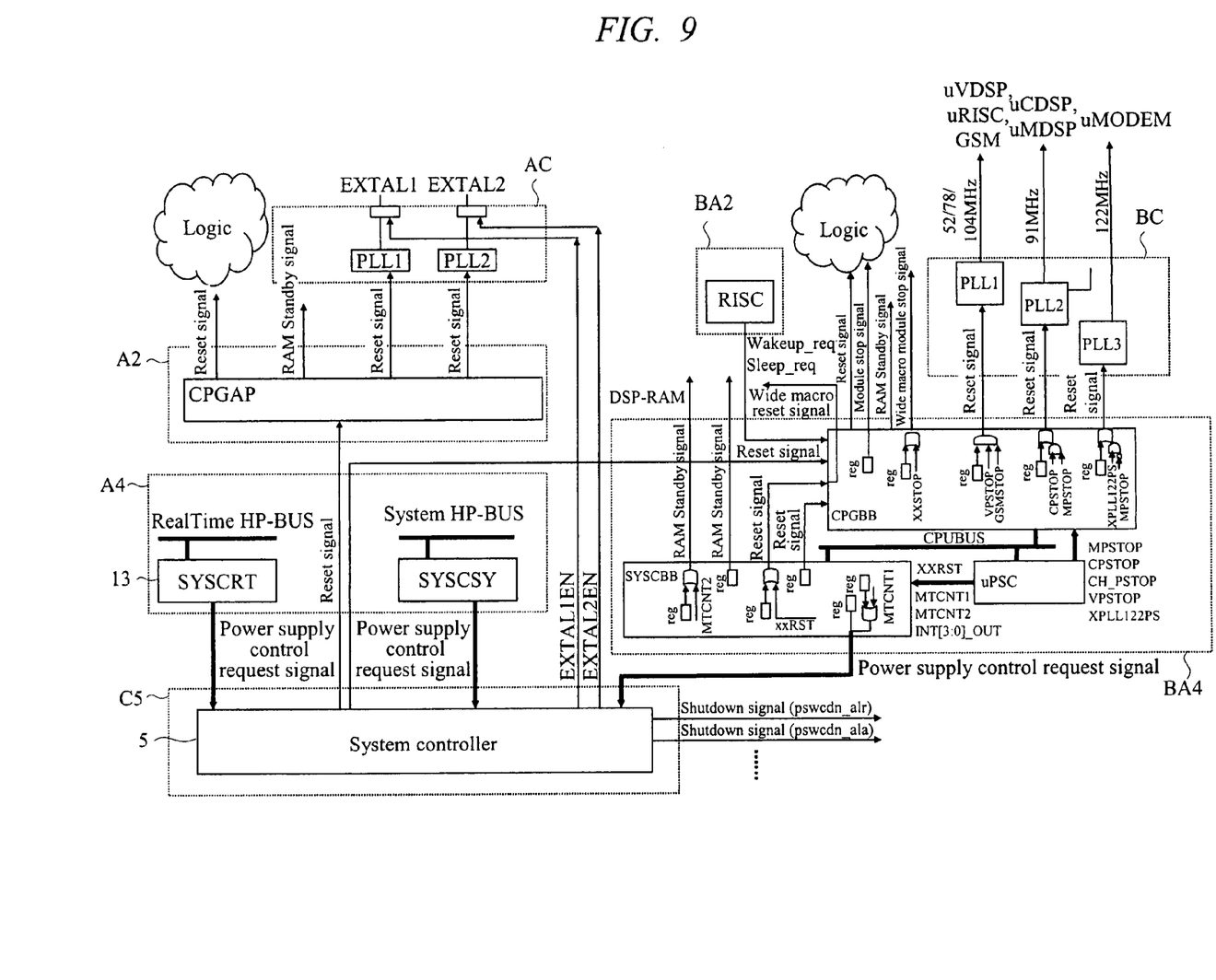
FIG. 9 is an explanatory diagram showing the power supply shutdown processing by the power supply control unit in FIG. 5.
Figure 10:
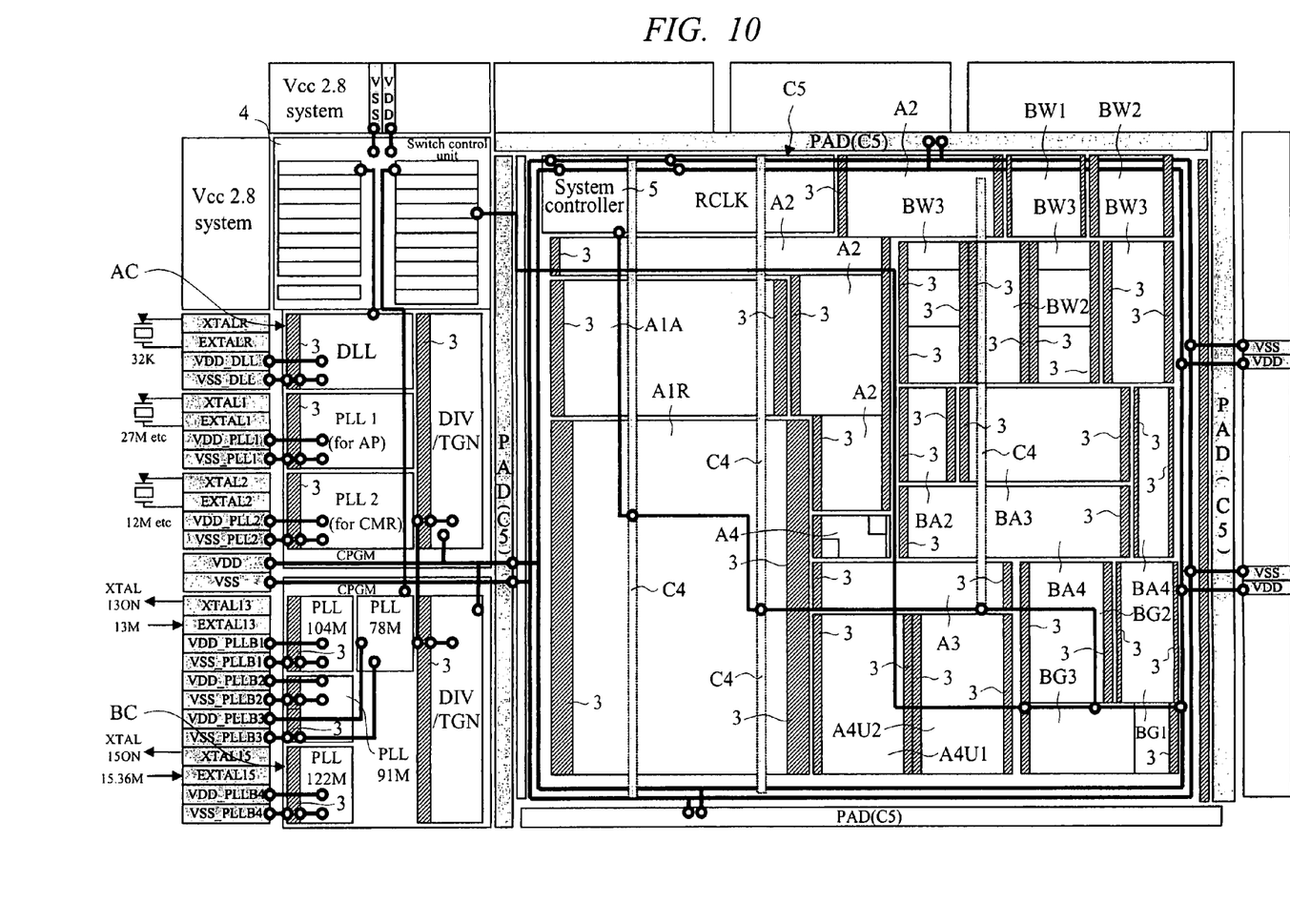
FIG. 10 is an explanatory diagram showing an example of chip layout image in the semiconductor integrated circuit device in FIG. 1.

FIG. 1 is an explanatory diagram showing power source areas in a semiconductor integrated circuit device according to an embodiment of the present invention. FIG. 2 is an explanatory diagram showing the hierarchical relations of core power source areas in the semiconductor integrated circuit device in FIG. 1. FIG. 3 is an explanatory diagram showing the structure of a power supply control unit provided in the semiconductor integrated circuit device in FIG. 1. FIG. 4 is an explanatory diagram showing a WUC which generates a wakeup signal to be inputted to a complementary logic unit provided in the semiconductor integrated circuit device in FIG. 1. FIG. 5 is an explanatory diagram showing an example of the structure of a power supply control unit and core power source areas around it provided in the semiconductor integrated circuit device in FIG. 1. FIG. 6 is a timing chart showing the sequence of wakeup processing by the power supply control unit in FIG. 5. FIG. 7 is a flowchart showing the sequence of wakeup processing by the power supply control unit in FIG. 5. FIG. 8 is a flowchart showing an example of power supply shutdown processing by the power supply control unit in FIG. 5. FIG. 9 is an explanatory diagram showing the power supply shutdown processing by the power supply control unit in FIG. 5. FIG. 10 is an explanatory diagram showing an example of chip layout image in the semiconductor integrated circuit device in FIG. 1.

In this preferred embodiment, a semiconductor integrated circuit device 1 is used in an electronic system such as a cellular phone and has a multi domain structure. FIG. 1 is an explanatory diagram showing power source areas in the semiconductor integrated circuit device 1.

As illustrated in FIG. 1, the semiconductor integrated circuit device 1 has core power source areas divided into, for example, 20 areas for each function, and thus, while the power supply to a part of core power source areas is turned OFF (shut down), the power supply can be performed to other core power source areas and normal operations can be performed in the core power source areas.

The semiconductor integrated circuit device 1 includes an application unit which processes applications such as audio, video and others, a base band unit which handles communication functions in mobile communications, a common unit which is used in common functions of the application unit and the base band unit, and a power supply control unit 2 which controls the power supply of the core power source areas of the application unit, the base band unit, and the common unit.

The application unit is divided into core power source areas (power source areas) A1A, A1R, A2, A3, A4, AC, A4U1, and A4U2. The base band unit includes a block adapted to the communication method of WCDMA (Wideband Code Division Multiple Access), a block adapted to the communication method of GSM (Global System for Mobile Communication), and a block for performing common processes in the base band unit.

This base band unit is divided into core power source areas (power source areas) BW1, BW2, BW3, BC, BG1, BG2, BG3, BA2, BA3, BA4, and BC, and the common unit is divided into core power source areas C4 and C5. A CPU for the base band process is arranged in the core power source area BA3.

The core power source area A1A is formed of a CPU for the system which performs the main control of the applications, and the core power source area A1R is formed of a real-time CPU which operates the necessary applications.

The core power source area A2 is formed of a BSC (Bus State Controller), an SBSC (SDRAM Bus State Controller), a DMAC (Direct Memory Access Controller), and a serial interface.

The BSC controls the access to a memory and an external device connected in an external address space. The SBSC controls the access to an external memory connected in an external address space. The DMAC controls data transfer among the external memory, peripheral modules, an internal memory and the like. The serial interface is an interface for serial communications.

The core power source area A3 is formed of an MVI (Mobile Video Interface), and the core power source area A4 is formed of an MFI (Multi Functional Interface).

The MVI receives data from the LCDC, generates packets in conformity to the MVI standard, and outputs the data. The MFI supports the mutual access of the base band unit and the application unit.

The core power source area AC is formed of a CPG (Clock Pulse Generator), and the core power source area A4U1 is formed of an LCDC (Liquid Crystal Display Controller). The core power source area A4U2 is formed of a URAM (User RAM).

The CPG generates an arbitrary clock pulse. The LCDC controls the display in a liquid crystal display. The URAM is formed of a SRAM and the like and is used as a user memory.

The core power source area BW1 is formed of a ROM (Read Only Memory), and the core power source area BW2 is formed of a DSP (Digital Signal Processor).

The core power source area BW3 is formed of a RAM (Random Access Memory), and the core power source area BC is formed of a CPG. The core power source area BG1 is formed of a ROM, and the core power source area BG2 is formed of a DSP.

The core power source area BG3 is formed of a RAM, and the core power source area BA2 is formed of an ETM (debugger). The core power source area BA3 is formed of a CPU for the base band, and the core power source area BA4 is formed of a DMA serial interface.

The core power source area C4 is formed of a repeater, and the core power source area C5 is formed of a system controller SYSC and a WUC (Wake Up Controller).

The ROM stores application programs and others. The DSP is a signal processor exclusive for the base band processing. The repeater is a relay point of a wire with a long wire length. The SYSC controls the power supply in the core power source areas. The WUC detects an external terminal and an interrupt signal for waking up the core power source areas whose power source is turned OFF.

In this structure, the power supply to these core power source areas A1A, A1R, A2, A3, A4, AC, A4U1, and A4U2 is controlled by the power supply control unit 2.

FIG. 2 is an explanatory diagram showing the hierarchical relations of the core power source areas A1A, A1R, A2, A3, A4, AC, A4U1, and A4U2.

The left side of FIG. 2 shows the hierarchical relations of the core power source areas A1A, A1R, A2, A3, A4, AC, A4U1, and A4U2 in the application unit, and the right side of FIG. 2 shows the hierarchical relations of the core power source areas BW1, BW2, BW3, BG1, BG2, BG3, BA2, BA3, BC, and BA4 in the base band unit. Also, the hierarchical relations of the core power source areas C4 and C5 in the common unit are shown below them.

In the left side of FIG. 2, the core power source area A1A where the system CPU that takes the main control of applications and the core power source area A1R where the real-time CPU that operates necessary applications are arranged at the highest hierarchical position of the application unit. Also, the core power source area A2 is positioned at the hierarchical level below the core power source areas A1A and A1R, the core power source area A3 is positioned at the hierarchical level below the core power source area A2, and the core power source area AC is positioned at the hierarchical level below the core power source area A3.

The core power source area A4 is positioned at the hierarchical level below the core power source area AC. Further, the core power source area C4 of the common unit is positioned at the hierarchical level below the core power source areas A4, A4U1, and A4U2, and the core power source area C5 is positioned at the hierarchical level below the core power source area C4, that is, at the lowest hierarchy.

In the right side of FIG. 2, the core power source areas BW1 and BG1 are arranged at the highest hierarchical position of the base band unit. Also, the core power source area BW2 is positioned at the hierarchical level below the core power source area BW1, and the core power source area BG2 is positioned at the hierarchical level below the core power source area BG1.

Further, the core power source area BA3 where the CPU for the base band is arranged is positioned at the hierarchical level below the core power source area BA2. The core power source areas BW3 and BG3 are positioned at the hierarchical levels below the core power source areas BW2 and BG2.

Also, the core power source area BC is positioned at the hierarchical level below the core power source area BA3 and the core power source areas BW3 and BG3, and the core power source area BA4 is positioned at the hierarchical level below the core power source area BC. The core power source area C4 of the common unit is positioned at the hierarchical level below the core power source area BA4.

The hierarchical relations in FIG. 2 show the dependency relations of the respective core power source areas, and when the core power source area at the upper hierarchy is to be turned ON, power must be supplied also to the core power source areas at the lower hierarchies shown by the arrow marks. This is because function modules arranged among the respective core power source areas are connected respectively by data signals, control signals and others and accesses are made frequently among the upper and lower function modules when performing the data calculation processing and data transfer processing and others, and therefore, when the core power source area at the upper hierarchy is to be turned ON, power must be supplied also to the core power source areas related thereto at the lower hierarchy.

For example, when the core power source area A1A at the highest hierarchy of the application unit is to be turned ON, the core power source areas A2, A3, AC, A4, C4, and C5 shown by the arrow marks must be turned ON (power supplied) respectively, too.

FIG. 3 is an explanatory diagram showing the structure of the power supply control unit (power supply control means) 2.

As shown in FIG. 2, the power supply control unit 2 is formed of a power supply switch (power supply switch control unit, switch) 3, a switch control unit (power supply switch control unit) 4, and a system controller (control unit) 5 provided in the core power source areas.

The power supply switch 3 is provided in each of the core power source areas and is connected between these core power source areas and a reference potential VSS. Also, on the basis of the control signal of the switch control unit 4, an arbitrary core power source area is connected/disconnected to and from the reference potential VSS so as to turn ON/OFF the power supply.

The switch control unit 4 is connected to the system controller 5. The switch control unit 4 is connected to each of the power supply switches 3, and when it receives a power supply switch-on request signal pctmsc (power-on request) from the system controller 5, it controls the ON/OFF of the power supply switch 3, and when the power supply switch 3 turns ON, it sends a power-on completion signal pswack (power-on acknowledge) back to the system controller 5.

The system controller 5 is formed of a wakeup control register (first register) 6, a current status register (second register) 7, a complementary logic unit 8, a next status register (third register) 9, and a power supply request logic unit 10.

The wakeup control register 6 generates a bit showing the core power source area to release the power supply shutdown (start the power supply) according to the interrupt signal (wakeup signal) requesting the power supply start outputted from an arbitrary core power source area. The current status register 7 stores the state of the current power supply shutdown release.

The complementary logic unit 8 complements and outputs the state of the next status according to the flag of the wakeup control register 6 or any one of the wakeup signals (interrupt signals) Wakeup_R, Wakeup_S, Wakeup_A, Wakeup_W, and Wakeup_G outputted from the WUC (FIG. 4) and the current status register 7.

By this control, it becomes possible to release the power supply shutdown of an arbitrary core power source area according to the input of the wakeup signal and also to control the power supply shutdown release to the core power source areas having the dependency relation shown in FIG. 2.

The next status register 9 stores the signal outputted from the complementary logic unit 8. The power supply request logic unit 10 controls the switch control unit 4 on the basis of the signal stored in the next status register 9.

FIG. 4 is an explanatory diagram showing a WUC 11 for generating the wakeup signals Wakeup_R, Wakeup_S, Wakeup_A, Wakeup_W, and Wakeup_G to be inputted to the complementary logic unit 8.

In FIG. 4, core power source areas C5, BG3, BW3, A2, A4, BA4, and A1R are respectively described.

As shown in FIG. 4, the wakeup signals Wakeup_R, Wakeup_S, Wakeup_A, Wakeup_W, and Wakeup_G are outputted from the WUC 11 provided in the core power source area C5.

The WUC 11 is formed of a detection circuit 12, a mask logic 13, and a plurality of logical sum circuits 14. The detection circuit 12 detects the interrupt signal caused from a wakeup inputted from the interrupt terminal.

The mask logic 13 outputs the control signal to the logical sum circuits 14 on the basis of the interrupt signal detected by the detection circuit 12 or the interrupt signal outputted from other core power source area (for example, various interrupt signals from the core power source area BG3 adapted to the GSM communication method, various interrupt signals from the core power source area BW3 adapted to the WCDMA communication method, or the like).

The logical sum circuit 14 calculates the logical sum of the control signal outputted from the mask logic 13 and outputs it as the wakeup signals Wakeup_R, Wakeup_S, Wakeup_A, Wakeup_W, and Wakeup_G to the system controller 5.

FIG. 5 is an explanatory diagram showing an example of the structure of the power supply control unit 2 and its peripherals (core power source areas A1R, A1A, A2, A4, and C5).

Power supply voltage VDD (for example, about 1.2 V) is supplied to the core power source areas A1R, A1A, A2, A4, and C5, and power supply voltage VCC (for example, about 3.3 V) is supplied to the switch control unit 4.

The power supply switch 3 is provided in each of the core power source areas A1A, A1R, A2, A3, A4, AC, A4U1, A4U2, and it connects/disconnects an arbitrary core power source area and the reference potential VSS on the basis of the control signal of the switch control unit 4 so as to turn ON/OFF the power supply.

The switch control unit 4 is connected to the system controller 5 via, for example, a level shifter LS. The switch control unit 4 is provided for each of the power supply switches 3, and it receives the power supply switch-on request signal pctmsc from the system controller 5 to control the ON/OFF operation of the power supply switch 3 and sends the power-on completion signal pswack back to the system controller 5.

The respective core power source areas are connected to a power source line to which the reference potential VSS and the power supply voltage VDD are supplied. For example, the core power source areas are connected to a power source line to which the reference potential VSS is supplied via the power supply switch 3. The system controller 5 and the switch control unit 4 perform the control to turn OFF the power supply switch 3 for the core power source area where the function modules to be in an operation stop state are arranged, thereby making it possible to shut down the power supply thereto and to achieve low power consumption.

In each core power source area, a latch R is provided in the input unit to which the logic signal outputted from the core power source area at the upper hierarchy is inputted. By this latch R, the logic signal is latched and unnecessary signals are shut down when the core power source area at the upper hierarchy is put into an OFF state.

Further, the core power source areas include those provided with a backup latch BR (for example, core power source areas A2 and A4). This backup latch BR latches the logic signal outputted from the core power source area at the upper hierarchy which is in an OFF state to send the signal back to the core power source area, and when the core power source area is put in an ON state, the core power source area that is in an ON state reads out the logic signal of the backup latch BR to transit to its original state.

Next, the operation of the power supply control unit 2 in this embodiment will be described.

The descriptions will be made with reference to the timing chart showing the sequence of the wakeup (power supply shutdown release) by the power supply control unit 2 in FIG. 6 and the flowchart of the wakeup processing by the power supply control unit 2 in FIG. 7.

FIG. 6 shows, from the top to the bottom, the respective signal timings of power supply voltages VCCQ, VCC, and VDD, reset clock RCLK, interrupt signal Wakeup caused from wakeup inputted from the interrupt terminal, wakeup signal Wakeup after noise removal inputted to the complementary logic unit 8, power supply switch-on request signal pctmsc outputted from the system controller 5, power-on completion signal pswack outputted from the switch control unit 4, power supply switch signal outputted from the switch control unit 4 to the power supply switch 3, latch shutdown signal for turning OFF the latch R outputted from the system controller 5, internal reset signal outputted from the system controller 5 to CPG, internal reset signal outputted from CPG to the core power source area, wakeup request signal outputted from the system controller 5 to CPG, wakeup completion signal outputted from CPG, DLL clock completion signal outputted from CPG, PLL clock completion signal outputted from CPG, and external oscillator stabilizing signal outputted from CPG to the system controller 5.

First, when the interrupt signal Wakeup caused from wakeup is inputted (FIG. 6A), the system controller 5 makes an instruction of wakeup to the corresponding switch control unit 4 (FIG. 6B) (step S102).

In the processing at this step S102, the power supply switch-on request signal pctmsc is outputted from the system controller 5 to the switch control unit 4. At this moment, the system controller 5 controls the power supply so that power is sequentially supplied from the core power source areas belonging to the lower hierarchy dependent on the core power source area to which power is supplied.

For example, in the case where power is supplied to the core power source area A2 in FIG. 2, the power supply is controlled so that power should be supplied first to the core power source area C4 at the lowest hierarchical level excluding C5 where power source is always ON among the hierarchical levels dependent on the core power source area A2. Accordingly, the system controller 5 outputs the power supply switch-on request signal pctmsc to the switch control unit 4 connected to the core power source area C4.

In response to this, the switch control unit 4 turns ON the power supply switch 3 connected to the core power source area C4, and when the power supply switch 3 turns ON, it sends the power-on completion signal pswack back to the system controller 5.

In response to this power-on completion signal pswack, the system controller 5 supplies power to the core power source area A4 at the upper hierarchy of the core power source area C4. Also in this case, similarly, the system controller 5 outputs the power supply switch-on request signal pctmsc to the switch control unit 4 connected to the core power source area A4, and in response to this, the switch control unit 4 turns ON the power supply switch 3 connected to the core power source area A4, and when the power supply switch 3 turns ON, it sends the power-on completion signal pswack back to the system controller 5.

Thereafter, the power supply to the core power source areas AC, A3, A2 in FIG. 2 is sequentially controlled in the same manner.

Then, when the power supply switch 3 connected to the core power source area A2 to which power is supplied last turns ON and the power-on completion signal pswack is sent back from the switch control unit 4 to the system controller 5 (FIG. 6C) (step S103), power-up preprocessing by CPG (PLL operation, clock supply, and the like) is performed (step S104).

In this power-up preprocessing, the wakeup request signal is outputted from the system controller 5 to CPG (FIG. 6D). Upon receiving this wakeup request signal, the CPG starts to supply the source oscillation clock to the core power source area concerned.

As the source oscillation clock, if the oscillation of CPG has not become stable yet, external clock supplied from the outside may be supplied or clock before the oscillation of CPG becomes stable may be used. That is, the source oscillation clock is not necessarily the clock supplied as the operation clock at normal operation to other function module such as PU, but the clock with any frequency may be supplied as the source oscillation clock as long as it is the clock necessary to guarantee the operation for a specified period.

Then, when the power-up preprocessing of CPG completes, the CPG concerned sends the wakeup completion signal to the system controller 5 (FIG. 6E) (step S105). Also, the supply of the system clock is started by the CPG, and the wakeup processing completes (step S106).

At this moment, the core power source area to which the source oscillation clock is supplied may be structured so that the system clock instead of the source oscillation clock is supplied from the CPG or may be structured so that necessary operation processing is completed during the above-described power-up processing period to make a transition to clock supply stop state (operation stop state).

Further, the step S101 corresponds to the case of the wakeup processing by the interrupt signal. In the wakeup processing by register control, however, a power supply control semaphore register provided in the system controller 5 is first read (step S107), and then a wakeup register provided in the system controller 5 is written (step S108).

After that, procedures are the same as those in the steps S102 to S105. The power supply control semaphore register is a register that is provided in the system controller 5 and accommodates the power ON/OFF control from the respective domains.

Next, the power supply shutdown processing by the power supply control unit 2 will be described below with reference to the flowchart in FIG. 8 and the explanatory diagram of the power supply shutdown sequence in the core power source area in FIG. 9.

In FIG. 9, the system controller 5 of the core power source area C5 and part of the core power source areas (core power source areas AC, A2, A4, BA2, BA4, BC) are respectively described.

First, reading of the power supply semaphore register is performed (step S201). Then, writing of the power-down register arranged in the system controller 5 is performed (step S202), and the power-down processing from the system controller 5 starts.

Upon receiving the power-down preprocessing control from the system controller 5, the power-down preprocessing by CPG (bus stop, clock stop, PLL stop, assert of the core power source area reset, and the like) is performed.

When the completion of the power-down preprocessing by the CPG is informed (step S203), the instruction of power supply shutdown is outputted from the system controller 5 (step S204). Then, the power supply of all the core power source areas concerned is shut down.

In this case, the system controller 5 outputs a signal to turn OFF the power supply switch 3 to the switch control units 4 connected to all the dependent core power source areas including the core power source areas whose power supply is shut down.

The corresponding switch control unit 4 turns OFF the power supply switch 3 and sends a completion signal showing that the power supply switch 3 has been turned OFF back to the system controller 5 (step S205). By doing so, the power supply shutdown processing is completed (step S206).

FIG. 10 is an explanatory diagram showing an example of a chip layout image in the semiconductor integrated circuit device 1.

In FIG. 10, the switch control unit 4 is positioned in the upper left side and the core power source area AC is provided under the switch control unit 4. The core power source area BC is laid out under the core power source area AC.

The core power source area C5 is laid out in the right side of the switch control unit 4, and the core power source areas A2 are positioned respectively in the right side of and under the core power source area C5. The core power source areas BW1 and BW2 are laid out respectively in the right side of the core power source area A2 in the right side of the core power source area C5.

The core power source area A1A is positioned under the core power source area A2 under the core power source area C5, and the core power source area A1R is laid out under the core power source area A1A.

The core power source areas BW3, BW2, and BW3 are laid out respectively from the left side to the right side under the core power source areas A2, BW1, and BW2. The core power source area BA2 is positioned under the core power source area BW3 at the left side, and the core power source area BA3 is arranged in the right side of the core power source area BA2.

The core power source areas BA4 are laid out respectively under the core power source areas BA2 and BA3 and in the right side of the core power source area BA3. The core power source areas A2 and A4 are arranged respectively from the top to the bottom in the left side of the core power source area BA4.

The core power source area A3 is arranged under the core power source areas A4 and BA4, and the core power source areas A4U1 and A4U2 are laid out respectively from the left side to the right side under the core power source area A3.

The core power source areas BG2 and BG1 are arranged respectively in the right side of the core power source area A4U2, and the core power source area BG3 is laid out under the core power source area BG2. Further, the core power source area C4 is laid out from the top to the bottom so as to divide the core power source areas C5, A2, A1A, A1R in the left side and the core power source areas A2, BW2, BA3, BA4, A3.

Further, in the right and left sides of the respective core power source areas laid out, the power supply switches 3 are laid out (areas shown by hatching). Also, in the case where the path of the signal outputted from the system controller 5 of the core power source area C5 becomes long (for example, from the system controller 5 to the core power source area BG3), the signal wire is laid out so that it passes through the core power source area C4.

Power source wires (VDD, VSS) are formed respectively above and in the right side of the respective core power source areas laid out.

In the structure described above, according to this embodiment, it is possible to optimize the power consumption of the semiconductor integrated circuit device 1.

Further, in the wakeup (power supply) processing of the core power source areas, since the dependent core power source areas are turned on in the hierarchical manner, it becomes possible to reduce the rush current when the power is supplied thereto, and it becomes possible to prevent the voltage drop at the moment of wakeup processing in the semiconductor integrated circuit device 1.

Furthermore, these layouts are not limited to the structure described above. A structure where core power source areas with function modules of high access frequency are arranged adjacently may be used. By providing the function modules in different core power source areas arranged adjacently, it becomes possible to shorten the signal wire length among function modules. Furthermore, by performing the power supply shutdown control while separating the core power source areas, it becomes possible to reduce the power consumption during the time when operations are not necessary.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, it is also possible to optimize the power consumption through simple control by combining the clock control and the power supply control.

In this case, when there is no access for a specified period after putting in a standby state, the power supply of the core power source areas is shut down automatically. By providing a setting not getting into the main mode with taking into account the expansion of the interrupt response time due to power recovery, the operation power can be optimized with minimum software sequence and without deteriorating the real-time characteristics.

Further, by combining the clock control for each function module (module stop) and the power supply control, the power consumption can be optimized with a simple control.

Since a semiconductor integrated circuit device is divided into function modules, when it is determined that the clock supply to all the function modules in the area is stopped from the setting of the function module stop, a power supply shutdown request is automatically issued to the area.

By providing a setting not getting into the power supply OFF request mode with taking into account the time required for power recovery, the operation power can be optimized without deteriorating the real-time characteristics and without software considering the core power source areas.

The present invention is suitable for a technology for reducing the power consumption in a semiconductor integrated circuit device.

What is claimed is:

1. A semiconductor integrated circuit device comprising:
a plurality of power source areas where power supply voltage supplied thereto is controlled individually,
wherein one or more function modules are arranged in said power source areas,
functionally related dependency relations are respectively associated with said plurality of power source areas; and
power supply control means is provided, which, when a control signal to supply power to an arbitrary power source area is outputted, controls power supply voltage so as to be supplied sequentially from a power source area belonging to a lower hierarchical level dependent on said arbitrary power source area to said arbitrary power source area,
wherein said power supply control means comprises:
a control unit which receives an interrupt signal for recovering from a power supply shutdown state to a power supply state and outputs a power supply switch request signal for performing a power supply to an arbitrary power source area according to said received interrupt signal; and
a power supply switch control unit which is provided in each of said power source areas and controls power supply voltage supplied in said power source area according to said power supply switch request signal outputted from said control unit,
wherein said power supply switch control unit comprises:
a switch connected between said power source area and a reference potential; and
a switch control unit which outputs a signal for controlling an operation of said switch on the basis of the power supply switch request signal outputted from said control unit and sends a power-on completion signal back to said control unit when said switch turns ON, and
wherein said control unit comprises:
a first register which stores flag information of the arbitrary power source area corresponding to said interrupt signal;
a second register which stores flag information showing the power supply state of said respective power source areas in current status;
a complementary logic unit which outputs flag information corresponding to the power source area dependent on the arbitrary power source area to which power is supplied, from said flag information of said first register, in reflection to the flag information of said second register;
a third register which stores flag information outputted from said complementary logic unit; and
a power supply request logic unit which, on the basis of the flag information of said third register, controls power supply voltage so as to be supplied sequentially from the power source area belonging to a lower hierarchical level dependent on said arbitrary power source area to said arbitrary power source area.

2. The semiconductor integrated circuit device according to claim 1, wherein, when the arbitrary power source area recovers from the power supply shutdown, said power supply control means performs a control to supply a dummy clock signal for initializing said power source area.

3. The semiconductor integrated circuit device according to claim 1, wherein, when the arbitrary power source area has a volatile semiconductor memory, said power supply control means determines a use state of said volatile semiconductor memory and sets said volatile semiconductor memory at a resume mode when the memory is not in use.

* * * * *